US006695023B1

(12) United States Patent
Saito

(10) Patent No.: US 6,695,023 B1
(45) Date of Patent: Feb. 24, 2004

(54) PNEUMATIC TIRE INCLUDING CLOSED SIPES

(75) Inventor: Osamu Saito, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/460,730

(22) Filed: Dec. 14, 1999

(30) Foreign Application Priority Data

Dec. 14, 1998 (JP) .......................................... 10-355166

(51) Int. Cl.$^7$ ........................ B60C 11/12; B60C 103/00
(52) U.S. Cl. .......................... 152/209.17; 152/209.18; 152/209.22; 152/DIG. 3
(58) Field of Search ................. 152/209.18, 209.17, 152/DIG. 3, 209.28, 903, 209.22

(56) References Cited

U.S. PATENT DOCUMENTS

| | | | |
|---|---|---|---|
| 2,261,025 A | * | 10/1941 | Havens |
| 4,649,975 A | * | 3/1987 | Kogure et al. |
| 4,676,290 A | * | 6/1987 | Tansei et al. |
| 5,109,901 A | * | 5/1992 | Miyamoto et al. |
| 5,160,385 A | * | 11/1992 | Goto et al. |

FOREIGN PATENT DOCUMENTS

| | | | | |
|---|---|---|---|---|
| EP | 855292 | * | 7/1998 | |
| EP | 0 865 943 A2 | | 9/1998 | |
| JP | 63-219404 | * | 9/1988 | |
| JP | 2-81773 | * | 3/1990 | |
| JP | 3-164305 | * | 7/1991 | |
| JP | 5-162511 | * | 6/1993 | |
| JP | 6-80002 | | 3/1994 | .......... B60C/11/12 |
| JP | 8-192607 | | 7/1996 | .......... B60C/11/04 |
| WO | 01/08906 A1 | | 2/2001 | |

OTHER PUBLICATIONS

Patent Abstracts of Japan, 06055911, Mar. 1, 1994, vol. 018, No. 292.
Patent Abstracts of Japan, 02081773, Mar. 22, 1990, vol. 014, No. 276.

* cited by examiner

Primary Examiner—Steven D. Maki
(74) Attorney, Agent, or Firm—Sughrue Mion, PLLC

(57) ABSTRACT

In a pneumatic tire comprising a tread which comprises a row of a plurality of blocks divided in the circumferential direction of the tire, a closed sipe is disposed at an approximately central portion of the block and is inclined in a direction opposite to a direction of transverse grooves with respect to an axial direction of the tire. Improved performance in driving on wet roads can be exhibited due to the transverse grooves and the closed sipes. Because the closed sipe is disposed at an approximately central portion of the block, pressure from the road surface can be dispersed to both sides of the closed sipe, and high pressure from the road surface at the central portion of the block can be reduced. Because the closed sipe is disposed so as to be inclined in the direction opposite to the direction of the transverse grooves with respect to the axial direction of the tire, sufficient rigidity of the block can be maintained, deformation at a time of contact with the road surface can be suppressed, and rolling resistance can be reduced.

20 Claims, 4 Drawing Sheets

PNEUMATIC TIRE INCLUDING CLOSED SIPES

BACKGROUND OF THE INVENTION

1. Field of the Invention

The present invention relates to a pneumatic tire in which, at the tread of the pneumatic tire, land portions, which extend in the circumferential direction of the tire and are separated by a plurality of main grooves extending in the circumferential direction of the tire, are separated into a plurality of blocks by grooves extending in a direction intersecting the circumferential direction of the tire.

2. Description of the Related Art

Pneumatic tires have been known in which, at the tire tread, land portions, which extend in the circumferential direction of the tire and are separated by a plurality of main grooves extending in the circumferential direction of the tire, are divided by plural grooves extending in a direction intersecting the circumferential direction of the tire.

It has also been known that performance of a tire in driving on wet roads can be improved by forming sipes in the tread or by increasing the negative ratio (the fraction of depressed portions) in the tread.

It has also been known that rolling resistance of a tire can be reduced by enhancing rigidity of land portions of the tread by not forming sipes or other methods, so as to suppress deformation.

However, when sipes are formed to an excessive degree to improve performance in driving on wet roads, a problem arises in that, although the edge component increases, the rigidity of the blocks decreases which causes a deterioration in the road-contacting property of the blocks and sufficient force is not generated.

When sipes are formed to an excessive degree, another problem arises in that deformation of the blocks increases and thus rolling resistance increases. Therefore, in conventional tires, it has not been possible to simultaneously achieve improved performance in driving on wet roads and reduced rolling resistance.

SUMMARY OF THE INVENTION

The present invention has been made to overcome the above problems, and an object of the present invention is to provide a pneumatic tire which can exhibit improved performance in driving on wet roads and reduced rolling resistance simultaneously.

In the pneumatic tire of the first aspect of the present invention, a tread comprises a plurality of main grooves extending in a circumferential direction of the tire and a plurality of land portions separated by the plurality of main grooves, said land portion comprising a row of a plurality of blocks divided in the circumferential direction of the tire by a plurality of transverse grooves which are open to main grooves at both sides in an axial direction of the tire, wherein the block has a closed sipe which is disposed at an approximately central portion of the block and whose both longitudinal direction end portions are located inside the block, the transverse grooves are disposed so as to be inclined in one direction with respect to the axial direction of the tire in one land portion, and the closed sipe is disposed so as to be inclined in a direction opposite to the direction of the transverse grooves with respect to the axial direction of the tire or is disposed parallel to the axial direction of the tire.

The pneumatic tire of the first aspect of the present invention exhibits improved performance in driving on wet roads at the time of driving and braking because the transverse grooves and the closed sipes are formed in the land portions. Moreover, because the transverse grooves and the closed sipes are inclined with respect to the axial direction of the tire, the performance in driving on wet roads at the time of making turns is improved by the effect of the tire circumferential direction edge components of the transverse grooves and the closed sipes.

When a block contacts the road surface, the pressure from the road surface tends to concentrate at the central portion of the block. However, the pneumatic tire of the first aspect has a closed sipe at an approximately central portion of the block. Therefore, the pressure from the road surface can be dispersed to both sides of the closed sipe and the high pressure from the road surface at the central portion of the block can be reduced.

In general, it is inevitable that formation of a sipe in a block causes a decrease in the rigidity of the block. However, when the sipe is formed in a manner such that the sipe is a closed sipe having both end portions located inside the block and is disposed parallel to the axial direction of the tire or inclined in the direction opposite to the direction of the transverse grooves with respect to the axial direction of the tire, the geometrical moment of inertia of the block can be maintained and sufficient rigidity of the block can be maintained, or, in other words, an excessive decrease in the rigidity of the block can be prevented.

Therefore, in the pneumatic tire of the first aspect, deformation of the blocks due to contact with the road surface can be suppressed, and rolling resistance can be reduced.

When a so-called open sipe having both end portions open to the sides of a block is formed in the block, the block is completely divided into portions and the rigidity of the block decreases to a great extent. Therefore, deformation of the block due to contact with the road surface increases and rolling resistance increases.

Even when a closed sipe is formed in a block, if the closed sipe is disposed in the same direction as that of the transverse grooves dividing the respective blocks, the rigidity of the block decreases, deformation of the block due to contact with the road surface increases, and rolling resistance increases.

In the pneumatic tire of the second aspect of the present invention in the pneumatic tire of the first aspect of the present invention, an angle between the transverse groove and the axial direction of the tire is 60° or less and an angle between the closed sipe and the axial direction of the tire is 60° or less.

When the angle between the transverse groove and the axial direction of the tire exceeds 60°, corner portions of the block have an excessively sharp angle which causes a decrease in the rigidity of the block. Deformation of the block due to contact with the road surface increases and rolling resistance increases, which is not preferable. The block also tends to deform in the axial direction of the tire due to the side force. Therefore, such angles are not preferable.

When the angle between the closed sipe and the axial direction of the tire exceeds 60°, even if the length in the longitudinal direction of the sipe is increased, the edge components in the axial direction of the tire which are required to obtain satisfactory performance in driving on wet roads at the time of braking and driving decrease (to one half or less). Therefore, such angles are not preferable.

Therefore, it is preferable that the angle between the transverse groove and the axial direction of the tire is 60° or less and the angle between the closed sipe and the axial direction of the tire is 60° or less, in order to simultaneously obtain sufficient rigidity of the block and improved performances in driving on wet roads at the times of making turns, driving and braking.

In the pneumatic tire of the third aspect of the present invention in the pneumatic tires of either of the first aspect or the second aspect of the present invention, given that the dimension of the closed sipe along the axial direction of the tire is represented by Wb and the dimension of the land portion along the axial direction of the tire is represented by Wa, Wb and Wa satisfy the relation Wb≦⅔Wa.

When the dimension Wb of the closed sipe along the axial direction of the tire exceeds ⅔ of the dimension Wa of the land portion along the axial direction of the tire, rigidity of the block excessively decreases, deformation of the block at the time of contact with the road surface increases, and rolling resistance increases. Therefore, such a condition is not preferable.

Accordingly, it is preferable that the relation Wb≦⅔Wa is satisfied to maintain sufficient rigidity of the block.

In the pneumatic tire of the fourth aspect of the present invention in any of the pneumatic tires of the first aspect, the second aspect and the third aspect of the present invention, given that a depth of the closed sipe is represented by h and a depth of the main groove is represented by H, h and H satisfy the relation (³⁄₁₀)H≦h≦(⁸⁄₁₀)H.

When the depth h of the closed sipe is smaller than ³⁄₁₀ of the depth H of the main groove, the ability to reduce the high pressure from the road surface at the central portion of the block deteriorates. Therefore, such a condition is not preferable.

When the depth h of the closed sipe exceeds ⁸⁄₁₀ of the depth H of the main groove, the rigidity of the block excessively decreases. Therefore, deformation of the block at the time of contact with the road surface increases, and rolling resistance increases. Therefore, such a condition is not preferable.

Therefore, it is preferable that the relation (³⁄₁₀)H≦h≦(⁸⁄₁₀)H is satisfied to maintain sufficient rigidity of the block while the high pressure from the road surface at the central portion of the block is reliably reduced.

In the pneumatic tire of the fifth aspect of the present invention in any of the pneumatic tires of the first aspect, the second aspect, the third aspect and the fourth aspect of the present invention, a width of the closed sipe is 2.0 mm or less.

An excessive decrease in the rigidity of the block can be prevented by keeping the width of the closed sipe at 2.0 mm or less.

When the width of the closed sipe exceeds 2.0 mm, the rigidity of the block excessively decreases, deformation of the block at the time of contact with the road surface increases, and rolling resistance increases. Therefore, such a condition is not preferable.

In the pneumatic tire of the sixth aspect of the present invention in any of the pneumatic tires of the first aspect, the second aspect, the third aspect, the fourth aspect and the fifth aspect of the present invention, the closed sipe is formed along a shorter diagonal line of diagonal lines of the block.

By forming the closed sipe along the shorter diagonal line of the diagonal lines of the block, the high rigidity of the block can be maintained.

DESCRIPTION OF THE PREFERRED EMBODIMENTS

An embodiment of the pneumatic tire of the present invention will be described with reference to FIG. 1.

Figure 1:
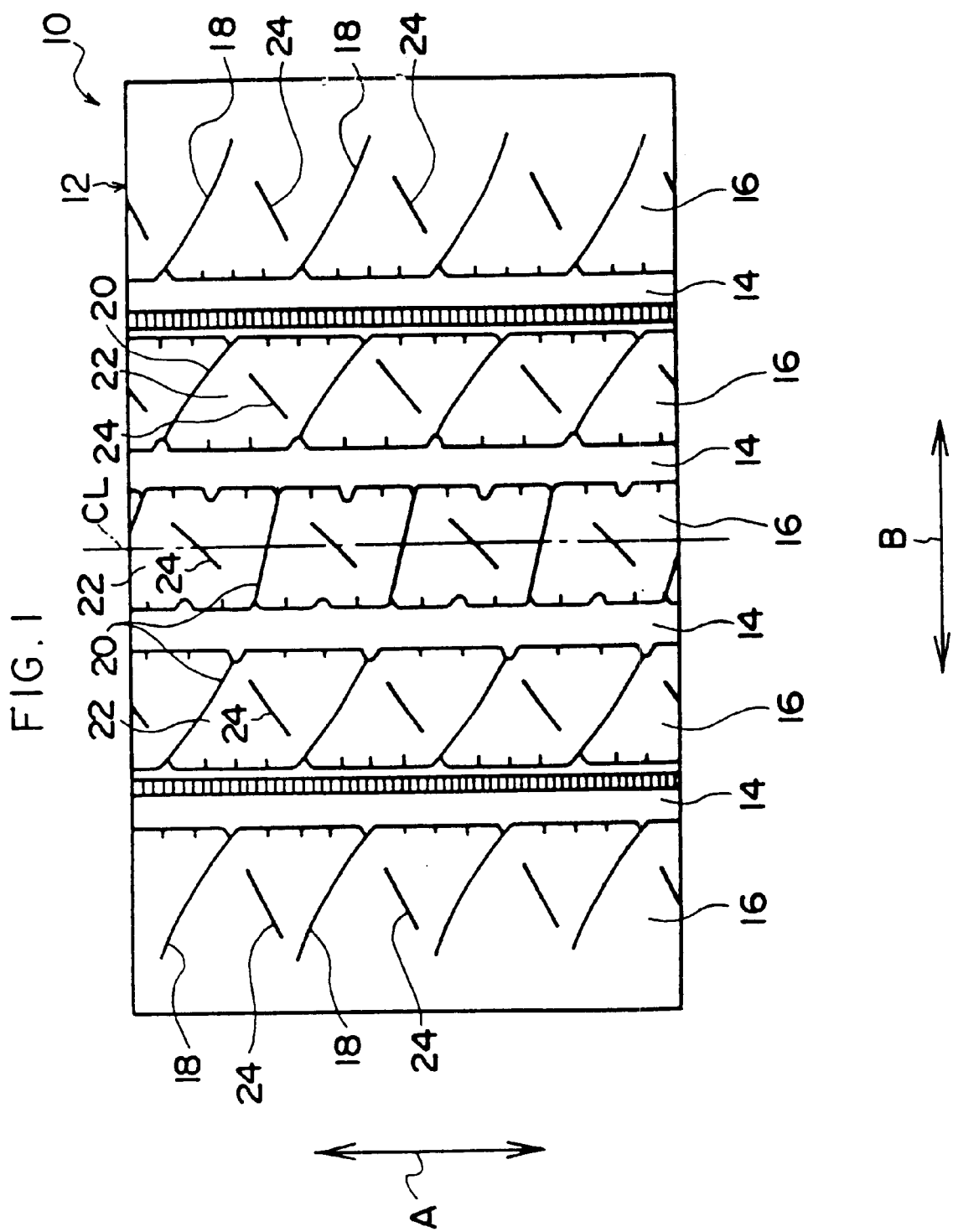
FIG. 1 is a plan view illustrating a tread of a pneumatic tire of an embodiment of the present invention.

As shown in FIG. 1, in a tread 12 of a pneumatic tire 10 of the present embodiment, a plurality of main grooves 14 (four main grooves in the present embodiment) extending in the circumferential direction of the tire (the direction shown by arrow A) are formed, and a plurality of land portions 16 (five land portions in the present embodiment) extending in the circumferential direction of the tire and separated by the plurality of main grooves 14 are formed.

In the land portions 16 at both side portions in the axial direction (the direction shown by arrow B) of the tire, a plurality of grooves 18 extending from the main grooves 14 toward the end portions of the tread are formed at positions separated from each other in the circumferential direction of the tire. The tire axial direction outer side end portion of each groove 18 is located inside the land portion.

Each of the three land portions 16 at the equatorial plane CL and at the sides of the equatorial plane CL of the tire is divided into a plurality of blocks 22 by a plurality of transverse grooves 20 which extend from one end portion to the other end portion of the land portion 16 to cut across the land portion 16. Both end portions of each transverse groove 20 open to the main grooves 14, and the transverse grooves 20 are formed at positions separated from each other in the circumferential direction of the tire.

The grooves 18 and the transverse grooves 20 in the present embodiment are all disposed inclined upward toward the left. However, the grooves may all be disposed inclined upward toward the right. The direction of the grooves is not restricted so long as the grooves are inclined in the same direction in one land portion. The directions of the grooves 18 and the transverse grooves 20 may be different between different land portions 16.

The depths of the groove 18 and the transverse groove 20 are set to be smaller than that of the main groove 14.

Figure 2:
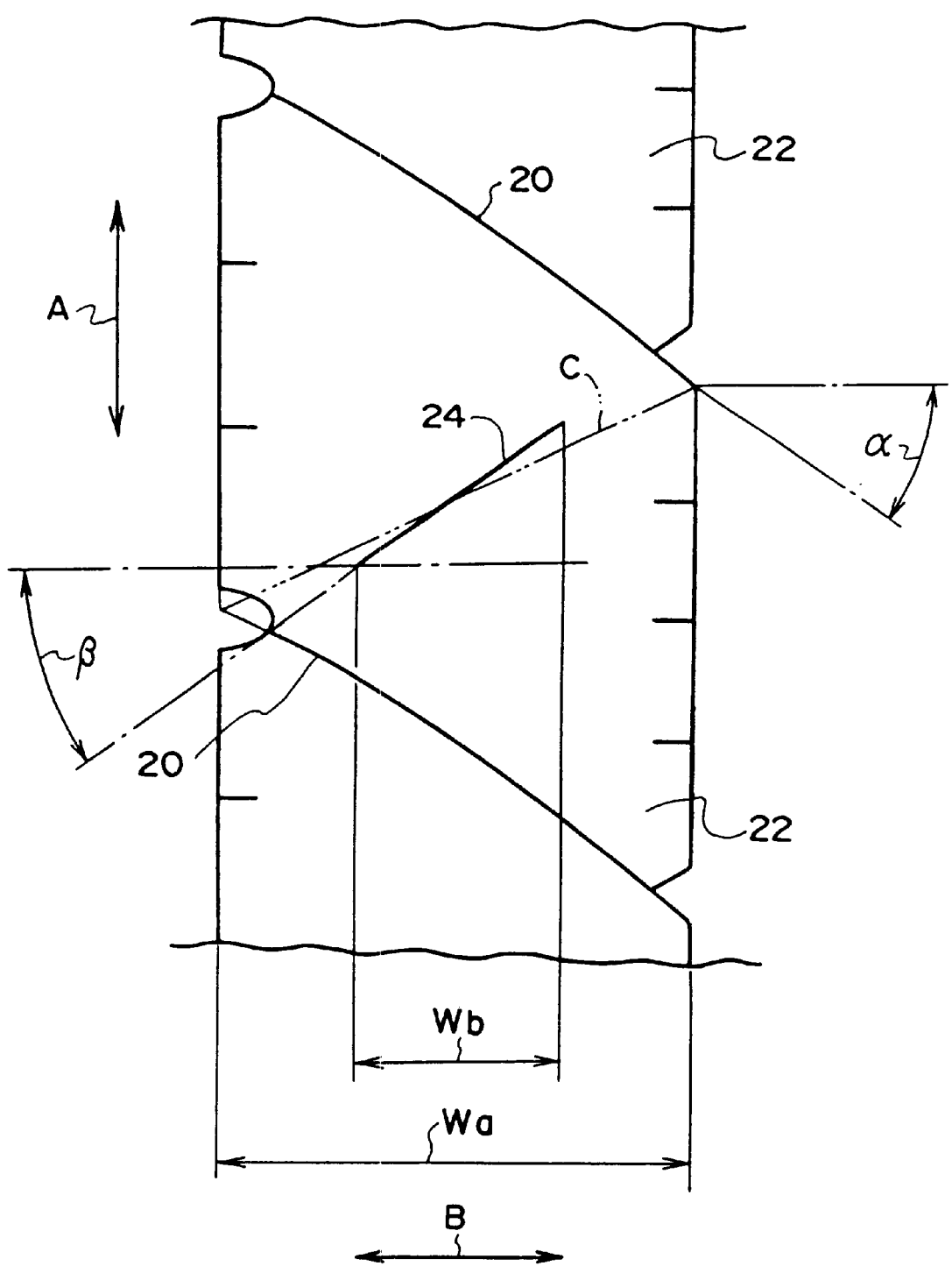
FIG. 2 is an enlarged view of a block shown in FIG. 1.

It is preferable that the angle α (see FIG. 2) between the transverse groove 20 and the axial direction of the tire is 60° or smaller.

The widths of the groove 18 and the transverse groove 20 may be substantially zero, or, for example, may be about 0.5 to 1.5 mm. However, the widths of these grooves may exceed this range.

At an approximately central portion of the block 22, a closed sipe 24 having both longitudinal direction end portions placed inside the block is formed substantially along the shorter diagonal line C of the diagonal lines of the block 22. In the land portions 16 at the side portions in the axial direction of the tire as well, a closed sipe 24 is formed at a portion between the grooves 18.

The depth of the closed sipe 24 is greater than that of the transverse grooves 20 and smaller than that of the main grooves 14.

It is preferable that, given that the dimension of the closed sipe 24 along the axial direction of the tire is represented by Wb and the dimension of the land portion 16 along the axial direction of the tire is represented by Wa, Wb and Wa satisfy the relation Wb≦⅔Wa.

In the tire of the present embodiment, the closed sipe 24 is disposed inclined in the direction opposite to the direction of the transverse groove 20 with respect to the axial direction of the tire (i.e., the closed sipe 24 is inclined upward toward the right). However, when the transverse groove 20 is disposed inclined with respect to the axial direction of the tire, the closed sipe 24 may be disposed parallel to the axial direction of the tire.

It is preferable that the angle β (see FIG. 2) between the closed sipe 24 and the axial direction of the tire is 60° or smaller.

It is preferable that, given that the depth of the closed sipe 24 is represented by h and the depth of the main groove 14 is represented by H, h and H satisfy a relation $(3/10)H \leq h \leq (8/10)H$.

It is preferable that the width of the closed sipe 24 is 2.0 mm or smaller.

The working of the pneumatic tire 10 of the present embodiment will be described hereinafter.

In the pneumatic tire 10 of the present embodiment, the closed sipe 24 is formed at an approximately central portion of the block 22 where the pressure from the road surface tends to be concentrated. Therefore, the pressure from the road surface can be dispersed to both sides of the closed sipe 24, and the high pressure from the road surface at the central portion of the block 22 can be reduced.

The sipe formed in the block 22 is the closed sipe 24 having both end portions located inside the block 22. The closed sipe 24 is disposed so as to be inclined in the direction opposite, with respect to the axial direction of the tire, to the direction of inclination of the transverse groove 20. Therefore, the geometrical moment of inertia of the block 22 can be better maintained than a case in which the closed sipe 24 is disposed parallel to the transverse groove 20 and sufficient rigidity of the block 22 can thus be maintained. As a result, deformation of the block 22 due to contact with the road surface can be suppressed, and rolling resistance can be decreased.

The angle α between the transverse groove 20 and the axial direction of the tire is 60° or smaller. Therefore, the corner portions of the block 22 do not become excessively sharp, sufficient rigidity of the block can be maintained, and an increase in rolling resistance can be prevented.

To improve the performance in driving on wet roads at the time of braking and driving, a sufficient edge component of the sipe in the axial direction of the tire is necessary.

In the present embodiment, the angle β between the closed sipe 24 and the axial direction of the tire is 60° or smaller. Therefore, even though the closed sipe 24 is inclined, a sufficient edge component in the axial direction of the tire can be maintained and excellent performance in driving on wet roads at the time of braking and driving can be maintained.

The dimension Wb of the closed sipe 24 in the axial direction of the tire is 2/3 or less of the dimension Wa of the land portion in the axial direction of the tire. Therefore, an excessive decrease in rigidity of the block 22 can be prevented and an increase in rolling resistance can be prevented.

The depth h of the closed sipe 24 is greater than or equal to 3/10 and less than or equal to 8/10 of the depth H of the main groove. Therefore, the high pressure from the road surface at the central portion of the block 22 can be reduced optimally and an excessive decrease in the rigidity of the block 22 can be prevented.

The width of the closed sipe 24 is 2.0 mm or smaller. Therefore, an excessive decrease in the rigidity of the block 22 can be prevented.

The closed sipe 24 is disposed along the shorter diagonal line C of the diagonal lines of the block 22. Therefore, the high rigidity of the block can be maintained.

In the present embodiment, the groove 18, the transverse groove 20 and the closed sipe 24 have the shape of a straight line or a slightly curved line. However, the shape is not limited to these shapes and may be, for example, a zigzag shape.

EXAMPLE

To confirm the advantageous effects of the present invention, two test tires of prior arts and one test tire of the example to which the present invention was applied were prepared and compared by tests on the performance in driving on wet roads and the rolling resistance (RR).

The test tires were as follows.

The test tire of the example had the pattern shown in FIG. 1.

Figure 3:
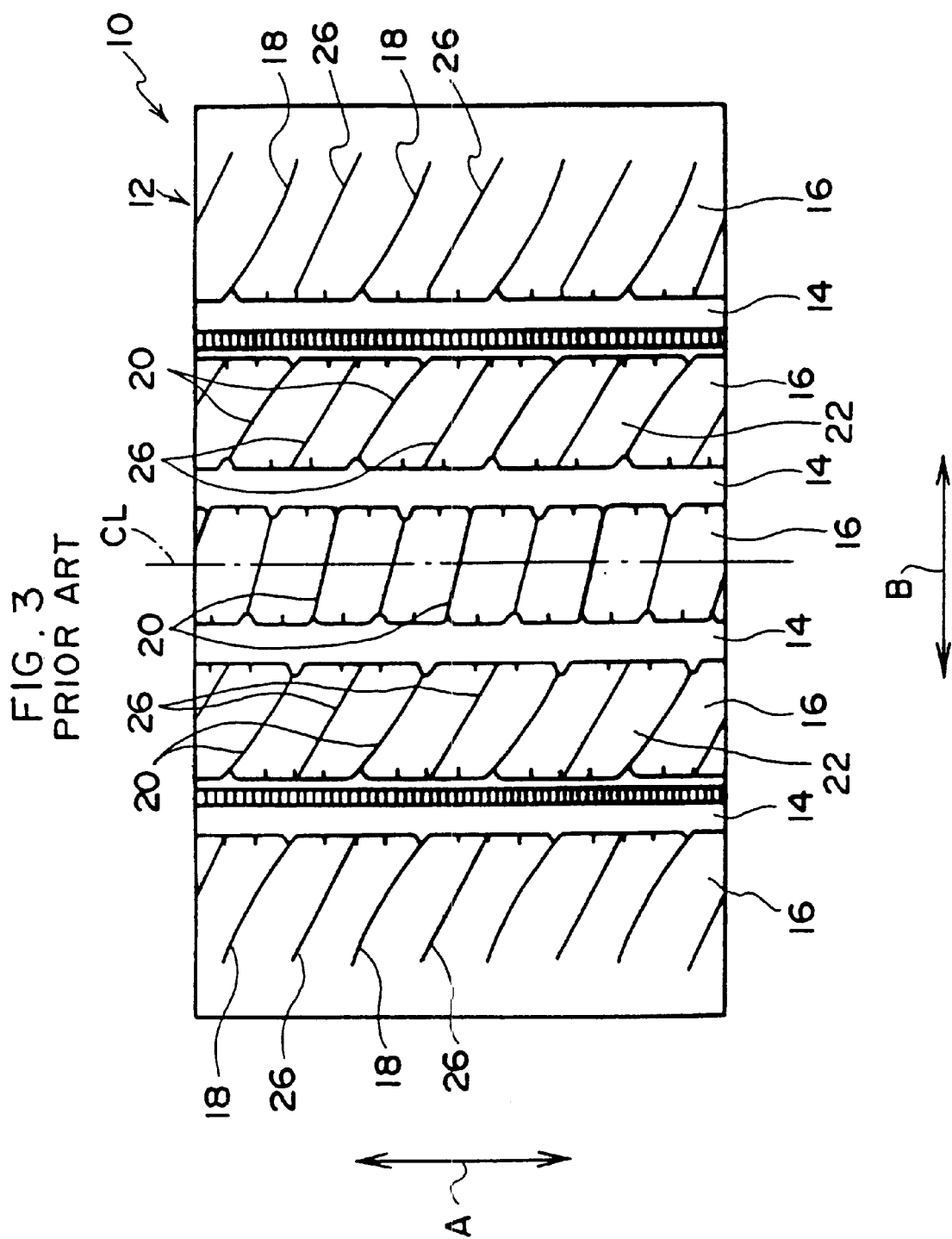
FIG. 3 is a plan view illustrating a tread of a pneumatic tire of prior art 1.

The test tire of prior art 1 had the pattern shown in FIG. 3. Sipes 26 which were inclined in the same direction as that of the transverse grooves 20 were formed in the land portions 16. The blocks 22 were completely divided into two portions by the sipes 26 which were open to the main grooves 20 at both end portions (so-called open sipes).

Figure 4:
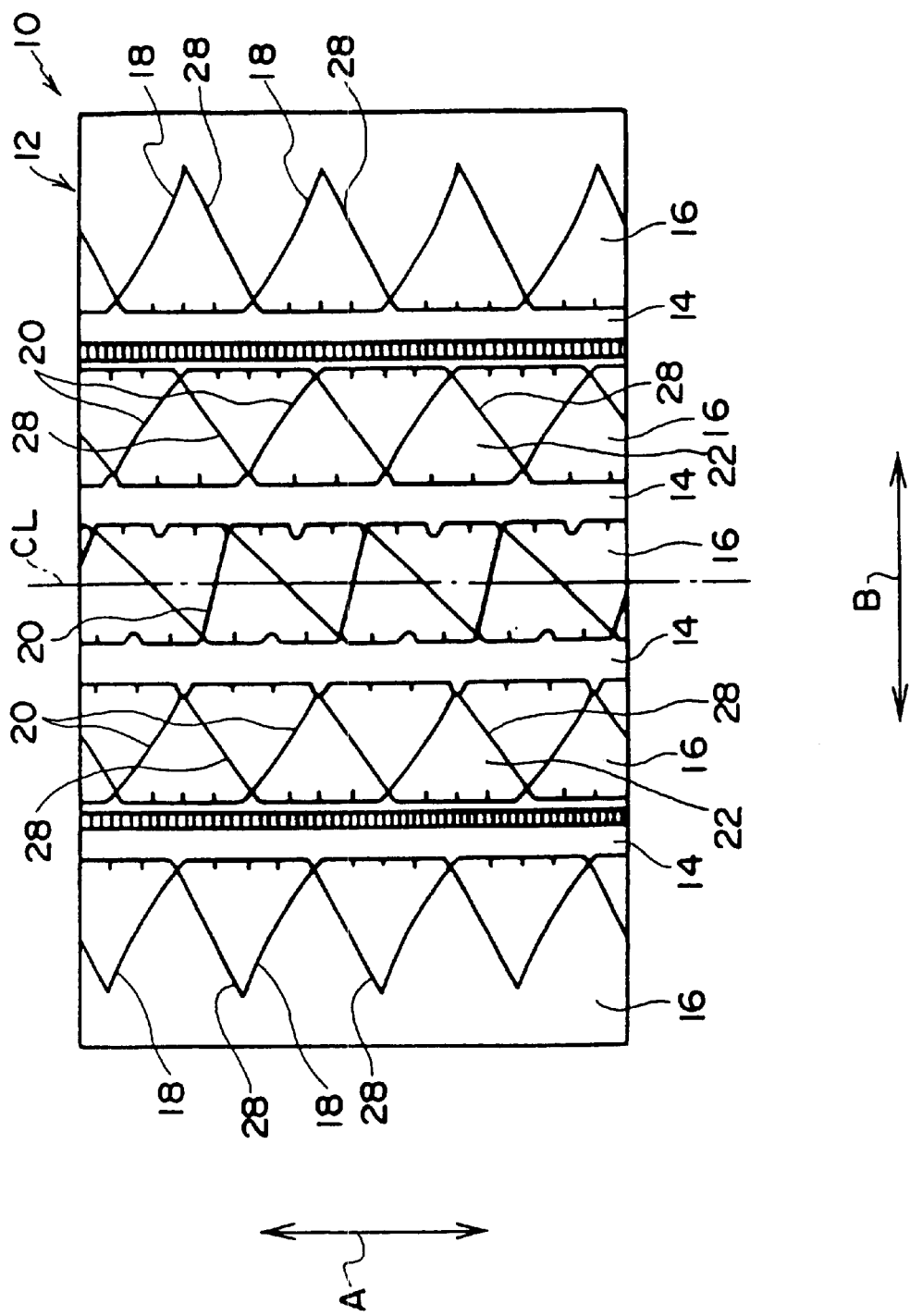
FIG. 4 is a plan view illustrating a tread of a pneumatic tire of prior art 2.

The test tire of prior art 2 had the pattern shown in FIG. 4. Sipes 28 which were inclined in the direction opposite to that of the transverse grooves 20 were formed in the land portions 16. The blocks 22 were completely divided into two portions by the sipes 28 which were open to the main grooves 20 at both end portions (so-called open sipes).

Each test tire had a size of TBR 315/70R22.5 and was attached to a rim of a size of 9.00×22.5.

To evaluate the performance in driving on wet roads, a front-wheel-drive vehicle to which the test tires were attached was driven (straight forward and making turns) along a test course (a wet surface having a low $\mu$) and the lap time was measured (with the tires being filled to standard internal pressure and with standard load applied thereto). The result of the evaluation was expressed as an index with the reciprocal of the lap time obtained by using the test tire of prior art 2 being an index of 100. The higher the index, the better the performance in driving on wet roads.

The rolling resistance was evaluated using an indoor drum tester (with the tires being filled to standard internal pressure and with standard load applied thereto and with the tire being rotated at a speed of 50 km/h). The result of the evaluation was expressed as an index with the rolling resistance of the test tire of prior art 2 being an index of 100. The smaller the index, the smaller the rolling resistance.

"Standard load" means the load capacity applied to a single wheel of an appropriate size and listed in the standards described below.

"Standard internal pressure" means the internal air pressure corresponding to the load capacity applied to a single wheel of an appropriate size and listed in the standards described below.

The above conditions are specified by the industrial standards which are valid in the area where the tire is produced or used. For example, these conditions are specified by "The Year Book of the Tire and Rim Association Inc." in the United States of America, by "The Standards Manual of the European Tire and Rim Technical Organization" in Europe and by "JATMA Year Book of the Japanese Automobile Tire Manufacturers Association" in Japan.

In Table 1, "shoulder" in the land portion row refers to a land portion at the outermost side portion of the tread in the transverse direction of the tire, "second" in the land portion row refers to a second land portion from the outermost side portion of the tread in the transverse direction of the tire and "center" in the land portion row refers to the land portion at the center of the tread in the transverse direction of the tire.

In Table 1, angle β for the tire of prior art 1 means the angle between the sipe 26 and the axial direction of the tire and the negative sign "−" indicates that the sipe is inclined in the same direction as that of the angle α. Angle β for the tire of prior art 2 means the angle between the sipe 28 and the axial direction of the tire.

TABLE 1

| Wb Land portion | Tire of prior art 1 Wa | | | Tire of prior art 2 Wa | | | Tire of Example 0.5 Wa | | |
|---|---|---|---|---|---|---|---|---|---|
| | center | second | shoulder | center | second | shoulder | center | second | shoulder |
| Transverse groove α (degrees) | 10 | 30 | 35 | 10 | 30 | 35 | 10 | 30 | 35 |
| Sipe β (degrees) | | 25 to 45 | | | −10 to −35 | | | 28 to 39 | |
| Width of sipe (mm) | | 1.0 | | | 1.0 | | | 1.0 | |
| Depth of sipe (mm) | | 10 | | | 10 | | | 10 | |
| Depth of main groove (mm) | | 14 | | | 14 | | | 14 | |
| Performance in driving on wet roads | | 100 | | | 95 | | | 120 | |
| Rolling resistance (index) | | 100 | | | 110 | | | 90 | |

The results of the tests show that the tire of the Example to which the present invention was applied exhibited improved performance in driving on wet roads and smaller rolling resistance than those of the tires of the prior arts.

As described above, the pneumatic tire of the present invention exhibits the advantageous effect that improved performance in driving on wet roads and reduced rolling resistance are simultaneously exhibited due to the structure described above.

What is claimed is:

1. A pneumatic tire comprising a tread which comprises a plurality of main grooves extending in a circumferential direction of the tire and a plurality of land portions separated by the plurality of main grooves, at least one land portion of said plurality of land portions comprising a row of a plurality of blocks divided in the circumferential direction of the tire by a plurality of transverse grooves which are open to main grooves at both sides in an axial direction of the tire, wherein each block has a closed sipe which is disposed at an approximately central portion of the block and whose both longitudinal direction end portions are located inside the block, the transverse grooves are disposed so as to be inclined in one direction with respect to the axial direction of the tire in one land portion, the closed sipe is disposed so as to be inclined in a direction opposite to the direction of the transverse grooves with respect to the axial direction of the tire or is disposed parallel to the axial direction of the tire, and the width of each transverse groove is in a range of 0.5 to 1.5 mm.

2. A pneumatic tire according to claim 1, wherein an angle between the transverse grooves and the axial direction of the tire is 60° or less and an angle between the closed sipe and the axial direction of the tire is 60° or less.

3. A pneumatic tire according to claim 2, wherein, given that a dimension of the closed sipe along the axial direction of the tire is represented by Wb and a dimension of the land portions along the axial direction of the tire is represented by Wa, Wb and Wa satisfy the relation Wb≦⅔Wa.

4. A pneumatic tire according to claim 3, wherein, given that a depth of the closed sipe is represented by h and a depth of the main grooves is represented by H, h and H satisfy the relation (³⁄₁₀)H≦h≦(⁸⁄₁₀)H.

5. A pneumatic tire according to claim 4, wherein the closed sipe is formed along a shorter diagonal line of diagonal lines of each block.

6. A pneumatic tire according to claim 3, wherein a width of the closed sipe is 2.0 mm or less.

7. A pneumatic tire according to claim 3, wherein the closed sipe is formed along a shorter diagonal line of diagonal lines of each block.

8. A pneumatic tire according to claim 2, wherein, given that a depth of the closed sipe is represented by h and a depth of the main grooves is represented by H, h and H satisfy the relation (³⁄₁₀)H≦h≦(⁸⁄₁₀)H.

9. A pneumatic tire according to claim 8, wherein a width of the closed sipe is 2.0 mm or less.

10. A pneumatic tire according to claim 2, wherein a width of the closed sipe is 2.0 mm or less.

11. A pneumatic tire according to claim 2, wherein the closed sipe is formed along a shorter diagonal line of diagonal lines of each block.

12. A pneumatic tire according to claim 1, wherein, given that a dimension of the closed sipe along the axial direction of the tire is represented by Wb and a dimension of the land portions along the axial direction of the tire is represented by Wa, Wb and Wa satisfy the relation Wb≦⅔Wa.

13. A pneumatic tire according to claim 12, wherein, given that a depth of the closed sipe is represented by h and a depth of the main grooves is represented by H, h and H satisfy the relation $(3/10)H \leq h \leq (8/10)H$.

14. A pneumatic tire according to claim 13, wherein a width of the closed sipe is 2.0 mm or less.

15. A pneumatic tire according to claim 14, wherein the closed sipe is formed along a shorter diagonal line of diagonal lines of each block.

16. A pneumatic tire according to claim 12, wherein a width of the closed sipe is 2.0 mm or less.

17. A pneumatic tire according to claim 1, wherein, given that a depth of the closed sipe is represented by h and a depth of the main grooves is represented by H, h and H satisfy the relation $(3/10)H \leq h \leq (8/10)H$.

18. A pneumatic tire according to claim 17, wherein a width of the closed sipe is 2.0 mm or less.

19. A pneumatic tire according to claim 1, wherein a width of the closed sipe is 2.0 mm or less.

20. A pneumatic tire according to claim 1, wherein the closed sipe is formed along a shorter diagonal line of diagonal lines of each block.

* * * * *